(12) United States Patent
Steinke et al.

(10) Patent No.: US 7,438,961 B2
(45) Date of Patent: Oct. 21, 2008

(54) PLIES SLEEVE FOR USE IN FORMING AN ELASTOMERIC TIRE

(75) Inventors: Richard A. Steinke, Boulder City, NV (US); Theodore M. Love, Las Vegas, NV (US)

(73) Assignee: Amerityre, Boulder City, NV (US)

( * ) Notice: Subject to any disclaimer, the term of this patent is extended or adjusted under 35 U.S.C. 154(b) by 395 days.

(21) Appl. No.: 11/328,400

(22) Filed: Jan. 10, 2006

(65) Prior Publication Data

US 2007/0158010 A1    Jul. 12, 2007

(51) Int. Cl.
  *B29D 22/00* (2006.01)
  *B29D 23/00* (2006.01)
  *B32B 1/08* (2006.01)
  *B60R 21/16* (2006.01)

(52) U.S. Cl. .................. 428/36.1; 428/190; 428/191; 428/365; 442/214; 152/526; 152/529; 152/536; 152/537

(58) Field of Classification Search ................ 428/36.1, 428/190, 191, 365; 442/214; 152/526, 529, 152/536, 537
See application file for complete search history.

(56) References Cited

U.S. PATENT DOCUMENTS 4,140,165 A * 2/1979 Lapeyre .................... 152/452

* cited by examiner

*Primary Examiner*—Michael C Miggins
(74) *Attorney, Agent, or Firm*—M. Reid Russell (57) ABSTRACT

A plies sleeve for use in forming a core of plies and beads on a core build mandrel where the plies sleeve is woven as a tubular sleeve having a uniform circumference that will stretch laterally, increasing the sleeve circumference to fit over a top surface or crown of the core build mandrel and is of a length to where each sleeve side will fold down an opposite core build mandrel side, passing around a tire bead, back up the cored build mandrel side and over the top surface or crown edge. Which outward sleeve stretching is provided by a select weave where Rayon cords are spiral wound as vertical components of approximately seven point (7.5) pics per inch, and elastic cords are included as horizontal components of approximately eight (8) pics per inch that are formed as pre-cure elastic cords from a urethane material and are cotton wound, to allow for sleeve stretching and provide for a return of the plies sleeve to its un-stretched state.

5 Claims, 10 Drawing Sheets

PLIES SLEEVE FOR USE IN FORMING AN ELASTOMERIC TIRE

BACKGROUND OF INVENTION

1. Field of the Invention

This invention pertains to plies for fitting onto a mandrel for forming a core of plies and beads, that may also include a belt or belts, with the formed core for fitting into a mold to receive a flow of an elastomeric material, forming a tire by molding or casting methods.

2. Prior Art

The present invention is in a plies sleeve that is capable of lateral outward flexure, increasing its circumference, as it is fitted onto a tire core mandrel whereon a core of plies and beads, with or without belts, is formed. The plies sleeve, when installed onto the mandrel, is to return to its original un-stretched shape, closing, in tight fitting engagement, across and around the mandrel outer surface. A utilization of a plies sleeve like that of the invention is shown, and its use described, in pending patent applications for spin casting and vacuum forming tires of two of the present inventors, as set out in U.S. patent applications entitled: "Improved Method and Apparatus for Forming a Core of Plies, Belts and Beads and for Positioning the Core in a Mold for Forming an Elastomeric Tire", Ser. No. 10/909,807, filed Aug. 2, 2004; and a "Method and Apparatus for Vacuum Forming an Elastomeric Tire", Ser. No. 10/936,635, filed Sep. 4, 2004. Which patent applications demonstrate a utilization of a plies sleeve for fitting over and sliding along an expander cone to pass across a tire core mandrel. Which sleeve open ends are each to receive a bead centering plate fitted through each sleeve end that pushes the plies sleeve end portions ahead of it, wrapping the plies sleeve ends around the beads that the bead centering plates have moved into proper positioning against the mandrel sides.

Prior to the above set out patent applications, plies were applied in stripes in a tire building process, that where bonded into layer between separators and were not, as with the present invention, fitted as a single unit over a core mandrel in the formation of a core of plies, beads, and belts, that an elastomeric tire was formed around. Heretofore, within the knowledge of the inventors, prior to the inventions set out in the cited earlier U.S. patent applications of the inventors, and the present invention, a plies sleeve has not been employed in a fabrication of any type of tire utilizing any manufacturing method or methods.

SUMMARY OF THE INVENTION

It is a principal object of the present invention to provide a plies sleeve that is woven from a cotton or rayon type material where the weave will stretch laterally, opening the sleeve circumference to pass along a plies sleeve guide and stretch over a build cord mandrel and includes elastic bands formed from an elastomeric material that are woven into the sleeve to be essentially parallel and located at spaced intervals therealong to stretch when the sleeve is stretched open and to return to their original un-stretched shape when the stretching force is removed, providing for the plies sleeve tightening around a tire build core mandrel top surface or crown.

Another object of the present invention is to provide a woven plies sleeve that is formed from an appropriate plies cord utilizing conventional sleeve weaving methods where the weave will allow the sleeve to be laterally stretched, and elastic bands formed from a pre-cure elastomer are woven into the sleeve during the weaving process that are parallel and spaced apart and horizontal along the sleeve to stretch, increasing the sleeve circumference, when the sleeve is pulled outwardly, and will contract, to pull the sleeve back to its un-stretched shape.

Another object of the present invention is to provide a plies sleeve formed by conventional weaving methods from rayon cords with cotton covered elastic bands woven, at spaced intervals, across the sleeve, that are elastic bands formed from a pre-cure elastomeric material to cure, providing a chemical mechanical lock of the plies sleeve in formed elastomeric tire.

Still another object of the present invention is to provide a plies sleeve where the elastic bands are formed from a pre-cured elastomeric material that has a cotton winding applied therealong, where the pre-cure material is compatible with, and will cure with an elastomeric material as is used to form the tire, preferably a urethane, forming a monolithic finished tire wherein the core that includes the plies sleeve is contained in.

Still another object of the present invention is to provide a woven plies sleeve formed utilizing conventional weaving methods that includes horizontal elastic bands woven into the sleeve at spaced lateral intervals that will stretch to pass across a tire core mold, and will relax to grip a tire core build mandrel top surface or crown.

The present invention is in a plies sleeve for installation over a tire core build mandrel in the formation of a core of plies and beads for mounting in a mold wherein an elastomeric tire is formed during a tire molding, casting or vacuum forming process. The plies sleeve of the invention is woven to have a length to extend, when it installed over the core build mandrel, down both tire sides, to allow for folding around beads at the core build mandrel hub and back up the core build mandrel sides and across the core build mandrel top surface or crown edges, maintaining tire beads that are each installed on each core build mandrel side. To provide for ease of passage of the sleeve over the core build mandrel and for the sleeve to fit tightly onto the top surface or crown of the core build mandrel, the sleeve is formed to stretch outwardly at its circumference and to flex back into close fitting engagement over the tire build mandrel top surface or crown when a stretching force is removed. To provide which plies sleeve stretching, the plies sleeve, that is preferably woven from a cotton and rayon, or like thread material that will bond with an elastomeric material, includes elastic cords woven, at spaced lateral intervals, into the plies sleeve. Which elastic cords are formed from a pre-cure elastomeric material that will cure when the elastomeric mixture of chemical constituents comes in contact therewith. Which elastomeric mixture, in their mixing, exhibits an exothermic heat of reaction, forming a homogeneous mixture where the elastomeric material an cured pre-cure elastomer provides a chemical mechanical lock of the elastomeric material through the plies cords. The preferred elastomeric material is a urethane, for casting into a tire containing the core that contains the plies sleeve of the invention.

In which plies sleeve weaving process, an elastic cord that is preferably formed from the pre-cure elastomer, preferably a pre-cure urethane, that is elastic is woven into the sleeve as horizontal cords, that provide for lateral sleeve expansion and will pull the sleeve back into close fitting engagement over the cord build mandrel top surface or crown when a lateral expansion force is removed. In which plies sleeve formation, a plain tubular weave or leno weave is utilized where horizontal and the elastic cords are cotton covered as by winding around and along the pre-cure urethane elastic cords, and with vertical woven cords formed from a rayon, preferably a 2440/2 denier. Which weave is preferably formed to have seven point five (7.5) ends per inch of the vertical Rayon cords, and eight (8) number or pics per inch of the cotton covered urethane cords. To provide for a desired stretch or lateral expansion of the tubular sleeve so as to allow it to stretch laterally to easily pass easily over the cord build top surface or crown, and contract into a snug fitting engagement over which core build mandrel when the stretching force is removed, the pre-cure urethane elastic cords are formed from an elastic urethane that is a pre-cure elastomer that will cure and combine with a flow of the elastomeric, preferably urethane constituents passed, that are passed into a mold cavity during a tire formation operation. The pre-cure polyurethane is to heat cure into with the polyurethane constituents flow that contains heat of an exothermic reaction produced by the mixing of which constituents, proving a homogenous cured urethane wherein the plies cotton and Rayon cords are chemically and mechanically locked to the tire material.

A spacing distance between the adjacent pre-cure urethane elastic cords is the number (N) or pics per inch, and which spacing distance is selected for a flat width, and, for preferred embodiment of the invention, eight (8) N or pics per inch are selected for a thirty eight (38) inch flat width that will retract when a laterally expansive force is removed into approximately a nine and one half (9½) inch flat width, providing for roughly a four (4) times expansion in the sleeve flat width. Which pre-cure urethane cords are woven as horizontal cords into the sleeve, where the weave is formed by Rayon cords as a continuous spiral weave as vertical members when viewing the sleeve from the side, with the Rayon 2440/2 denier cords preferably spaced approximately seven point five (7.5) pics per inch. So arranged, the sleeve of the invention is easily expanded to fit over a tire build core mandrel at its top surface or crown, and will close tightly thereover. With, in the tire molding or casting process, the pre-cure elastomeric cords are cured, combining with the elastomeric material, preferably a urethane material forming a homogeneous tire core.

DESCRIPTION OF THE DRAWINGS

The invention may take physical form in certain parts and arrangement of parts, used to form the plies sleeve of the invention that is herein shown as a preferred embodiment and will be described in detail in this specification and illustrated in the accompanying drawings which form a part hereof.

DETAILED DESCRIPTION

Figure 1:
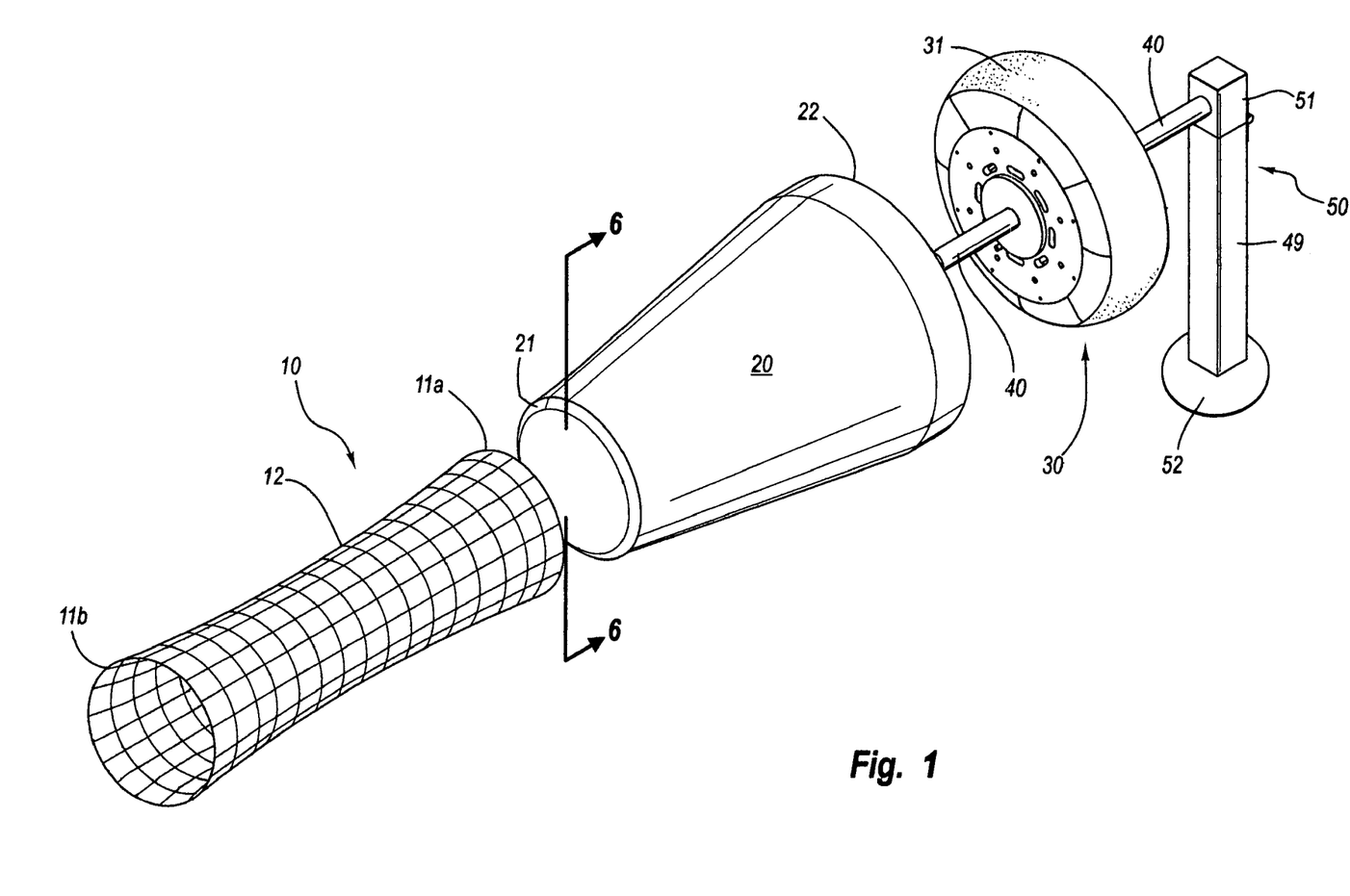
FIG. 1 shows an exploded side elevation perspective view taken from a forward end of a tire core build stand that includes a core build mandrel that is axially mounted to extend at a right angle from the top of a pivoting arm, showing a plies sleeve expander cone aligned for fitting axially to extend over the cord build mandrel, and showing a plies sleeve of the invention aligned for sliding onto the sleeve expander cone.

The invention is in a plies sleeve 10 that has, as shown in FIG. 1, a forward end 11a that is aligned with rear end 21 of a plies sleeve expander 20. The plies sleeve expander 20 is shown as a truncated cone that has a forward end 22 that is aligned, to fit over a core build mandrel 30 of a build stand 50. The plies sleeve 10 is formed to expand outwardly, increasing in circumference, as it is slid along the plies sleeve expander 20, and to contract, gripping the core build mandrel 30 across its top surface or crown 31, as it travels off of the plies sleeve expander 20, as shown and described in FIGS. 6 through 9. To provide for which expansion and gripping, the plies sleeve 10 is preferably manufactured to allow the sleeve to be stretched apart, producing a uniform tube, as shown in FIGS. 2 through 5. Which manufacture is by conventional weaving methods utilizing, for example, a tubular plane or leno weave, or other appropriate weaving method, that will provide a sleeve that will stretch laterally and will return to its original configuration when a stretching force is removed. It should therefore be understood that the invention is not limited to a particular weaving method so long as the selected weaving method will produce a plies sleeve 10 that is capable of being stretched laterally and return to its original shape. The weave of the plies sleeve preferably utilizes a Rayon cord, with a Rayon cord that is a 2240/2 denier, is shown as vertical cords 13, with the selected weave allowing the plies sleeve 10 to be laterally stretched, with the stretched attitude shown in FIG. 4, and the plies sleeve in its relaxed state shown in FIG. 5. For the invention, cotton covered elastic cords 12 provide for a return of the plies sleeve 10 back to its original shape, as shown in FIG. 5, when a stretching force is removed. Which elastic cord 12 is a formed with an elastic core 14 that is formed from a pre-cure elastomeric material, preferably a urethane. Which pre-cure is selected to provide for a curing under a heat as produced from a mixing of the elastomeric material constituents as are mixed together for passage into a mold containing the core that includes the plies sleeve 10 of the invention, in the formation of a tire. Preferably, a urethane is selected as the elastomeric material that is formed into elastic cords that are wrapped with cotton, as shown at 15 is FIGS. 4 and 5, the elastic cords to provide for returning the plies sleeve 10 back to an un-stretched attitude, as shown in FIG. 5, after a stretching force has been removed. For the invention, the stretching force is provided by the movement of the plies sleeve 10 along the plies sleeve expander 20, as shown in FIG. 6, spreading the horizontal cords 11 apart, and stretching the elastic cords 12.

Figure 4:
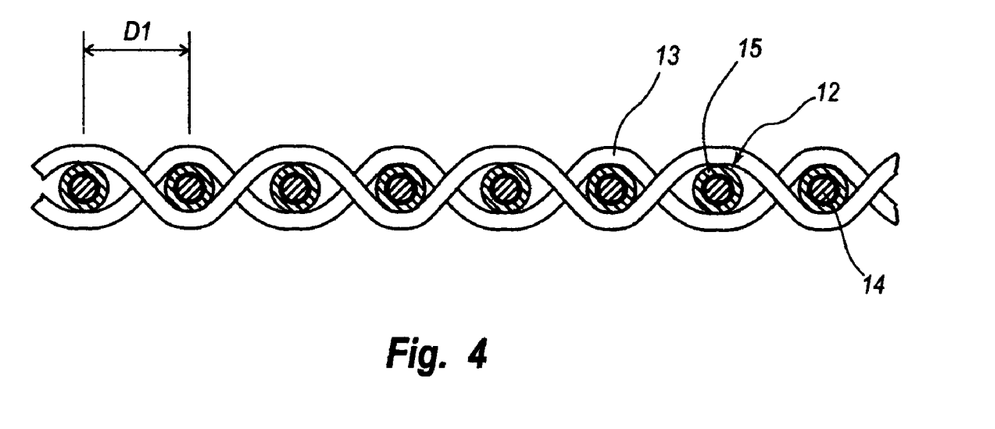
FIG. 4, shows an expanded sectional view taken along the line 4-4 of FIG. 3 showing the sleeve horizontal cords as formed from an elastic material and wound with cotton and with vertical cords interlacing which horizontal cords, and showing the vertical cords as having been spread apart, spreading apart the cotton wound elastic cords a distance D1.
Figure 5:
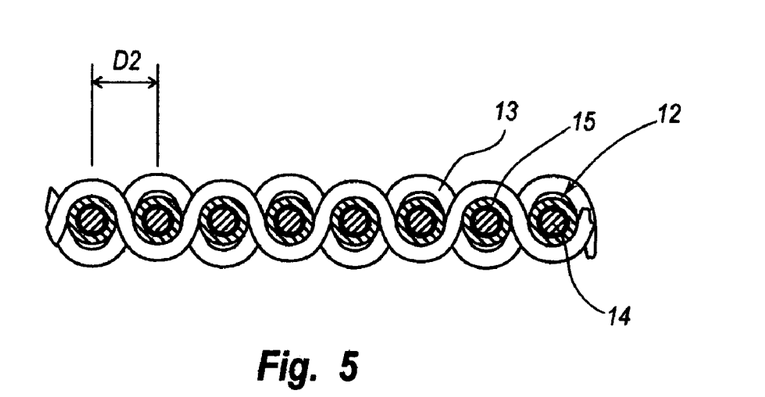
FIG. 5, shows the sectional view of FIG. 3 only showing the vertical cords as having retracted to where the cotton wound elastic cords have retracted to distance D2.
Figure 6:
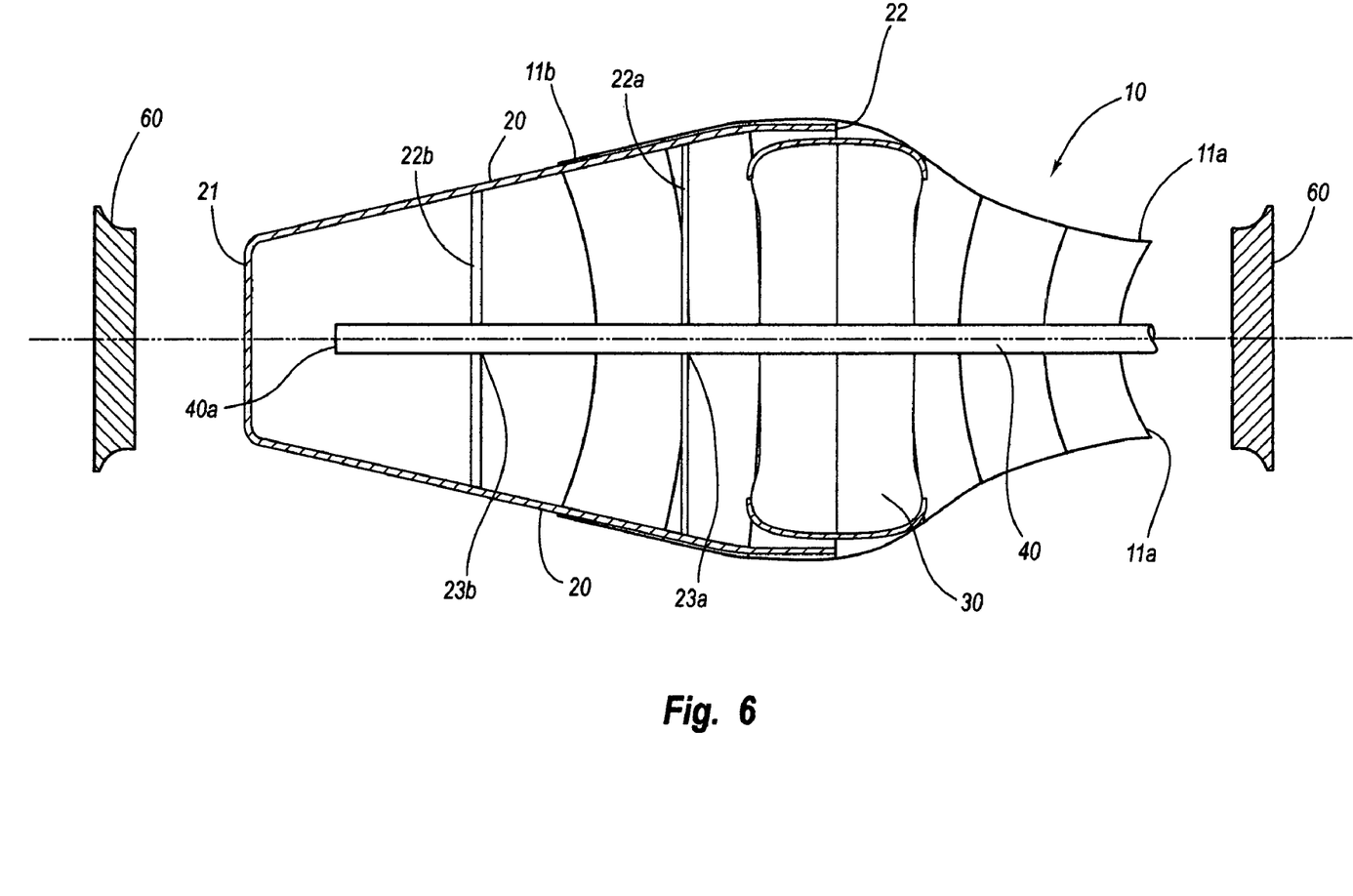
FIG. 6 shows a side elevation sectional view taken along the line 6-6 of FIG. 1 looking at the core build mandrel with the expander cone large diameter end slid along the expander cone to the center of the top surface of the core build mandrel, showing the plies sleeve end as having been drawn over and beyond the cord build mandrel and showing a pair of hard plate assemblies for bead centering and plies cords positioning aligned with the ends of the plies sleeve.

The elastic cords 12, shown best in FIGS. 4 and 5, include an elastomeric core 14 that is a pre-cure that will cure when heated in a molding or casting process where the elastomeric constituents, when mixed, experience an exothermic reaction, produce heat, with that mixture, when passed into a mold containing a core formed with the plies sleeve 10, cures the pre-cure, forming a homogeneous cured tire, providing a chemical-mechanical lock to the cotton winding 15 around the core 14 as well as locking to the Rayon 2440/2 denier cords 13. A finished tire is thereby produced with the core constituents, the plies and beads, and belts, if used, cannot separate from the tire outer casing even when subject to high heat as, for example, when the tire is run with little or no air in it.

Figure 2:
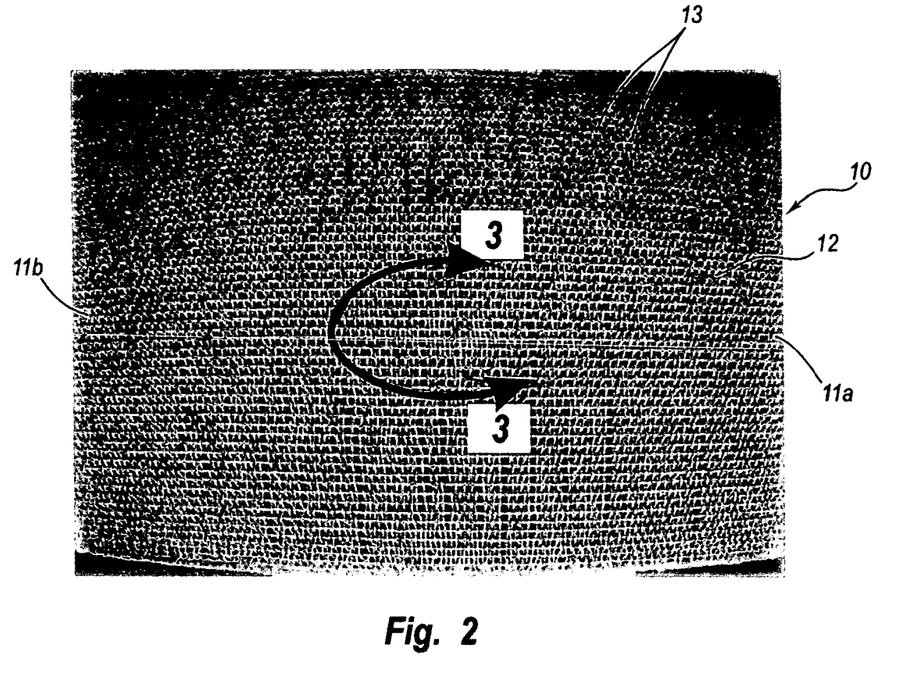
FIG. 2 shows a top plan view of a section of a plies sleeve of the invention as shown in FIG. 1.
Figure 3:
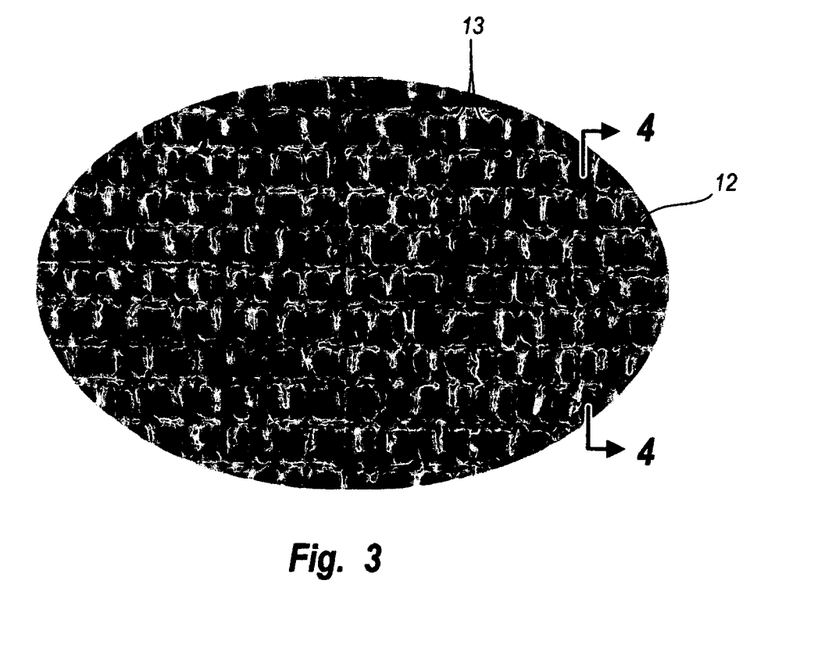
FIG. 3 is an expanded sectional view taken within the line 3-3 of FIG. 2.

To provide for lateral expansion of the plies sleeve 10, so as to allow it to pass over the plies sleeve expander 20 of FIG. 1, the sleeve is woven to have an accordion appearance that allows it to stretch laterally outwardly, expanding its circumference, stretching the elastic cords 12 that then pulls the weave to pull back to its un-stretched attitude when a stretching force is removed. In practice, the preferred weaving process to provide which accordion weave is the tubular plane or leno weave, as set out above, where the weave incorporates a spacing distance N or pics per inch, as shown in FIG. 3 as a flatted section, between the cotton covered pre-cure elastic cords 12, and with the weave, for the plies sleeve of the invention, having seven point five (7.5) pics per inch of, preferably, Rayon 2440/2 denier cord, and has eight (8) pics per inch of the cotton covered pre-cure urethane cord. So arranged, the weave will have an expansion of approximately four times the flat width, as illustrated in FIGS. 2 and 3, allowing the sleeve to stretch so as to slide easily over the plies sleeve expander 20 and onto the core build mandrel 30, of FIG. 1, and close thereover by the action of the elastic pre-cure urethane cords 12, causing the plies sleeve 10 to grip the top or tread surface 31 of the core build mandrel 30.

A spacing distance between the adjacent pre-cure urethane elastic cords is the number (N) or pics per inch and is selected for a flat width, with, for the invention, eight (8) pics per inch are selected for a thirty eight (38) inch flat width that will pull into approximately a nine and one half (9½) inch flat width, providing for roughly a four (4) times expansion in the sleeve flat width. Which pre-cure urethane cords 12 are a woven as horizontal cords into a continuous Rayon cord 13 that is spiral woven into the sleeve as lateral members when viewing the sleeve from the side, providing the desired spacing distance. In practice, the vertical Rayon 2440/2 denier cords 13 are spaced approximately seven point five (7.5) each to the inch.

FIG. 1 illustrates a use of the plies sleeve 10 to form a core used in the manufacture of an elastomeric tire. In the formation of the core, a forward end 11a of the plies sleeve 10 is aligned for sliding over a rear end 21 of the plies sleeve expander 20, with it being understood that a plies sleeve rear end 11b is identical to the forward end 11a. A forward end 22 of which plies sleeve expander 20 is shown aligned for fitting partially across a tread area 31 of the core build mandrel 30. Which build mandrel is for building up a core of plies, beads and belts thereon for fitting into a mold to cast, mold or vacuum form a tire thereon. The core build mandrel 30 is axially mounted onto an axle 40 that is secured on one end to extend at a right angle outwardly from a head or top end 51 of the build stand 50 that is mounted to a floor at a base 52, and is fitted into to support the plies sleeve mandrel.

FIGS. 6 through 12 illustrate the for formation of the core utilizing the plies sleeve 10 of the invention, and the equipment used in that formation by casting, molding or vacuum forming methods. FIG. 6 is a sectional view taken along the line 6-6 of FIG. 1 that shows the plies sleeve expander 20 positioned across an edge of the core build mandrel 30, to the center thereof. The plies sleeve expander 20 is shown as including parallel spaced forward and rear inner walls 22a and 22b, respectively that each have a center hole 23a and 23b, respectively, formed therethrough that align to receive the end 40a of axle 40 passed therethrough. The axle 40 supports and guides the plies expander cone 20 as it is slid back and forth therealong. The plies sleeve 20 forward end 11a is shown as having been pulled across the plies expander cone 20 rear and forward ends 21 and 22, respectively, essentially centering the core build mandrel 30 within the plies sleeve 10, and the plies sleeve 10 is shown as having laterally expanded, with the elastic cords 12 drawing the sleeve into close fitting engagement with the core build mandrel 30 top surface or crown 31. Whereafter, the plies expander cone 20 is removed and a pair of hard plate assemblies 60, that are for bead centering and plies cords positioning, are shown aligned for fitting within the ends 11a and 11b of the plies sleeve 10 for use in positioning each of a pair of beads 61, shown in FIGS. 7 and 8, onto the build core mandrel sides, to allow for wrapping the plies sleeve ends therearound, as set out below.

Figure 7:
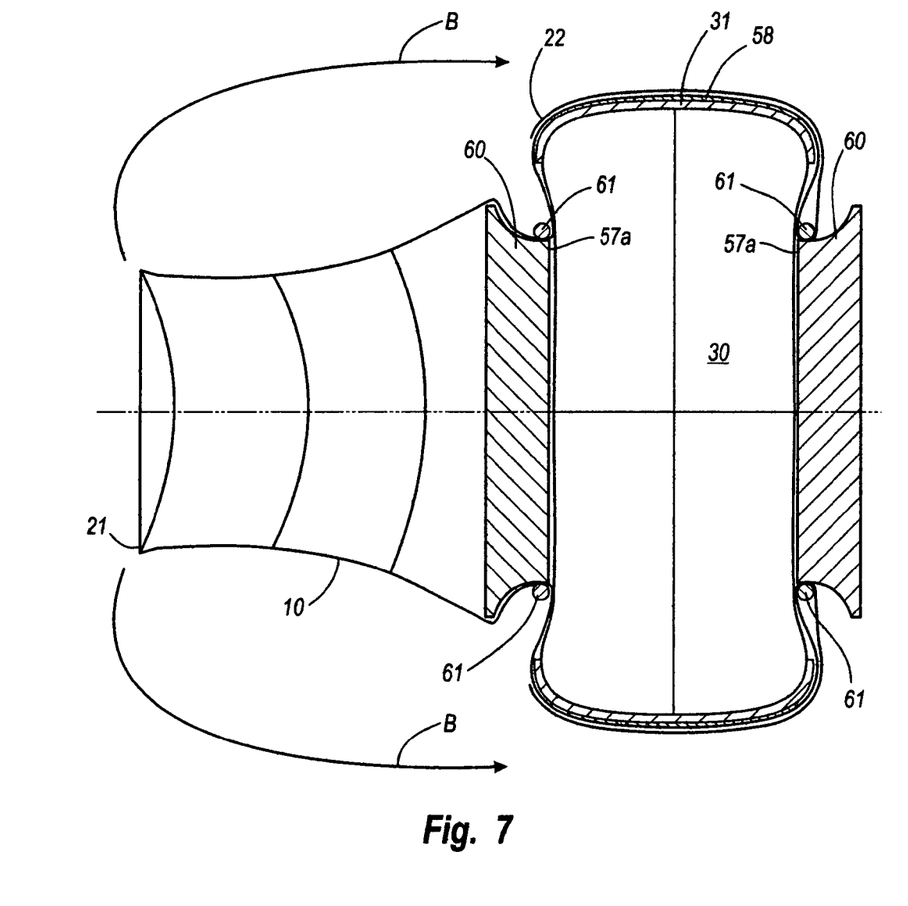
FIG. 7 shows the side elevation sectional view of FIG. 6 showing the hard plate assemblies as having passed into the plies cords sleeve ends to where the right hard plate contacts the side of the core build m mandrel and showing an end of the plies sleeve as having been folded over the bead and extending across a top surface or crown of the core build mandrel, and showing a left bead maintained by the hard plate edge against the core build mandrel left side with arrows B indicating how the plies sleeve left side will be pulled over the core build mandrel top surface or crown.
Figure 8:
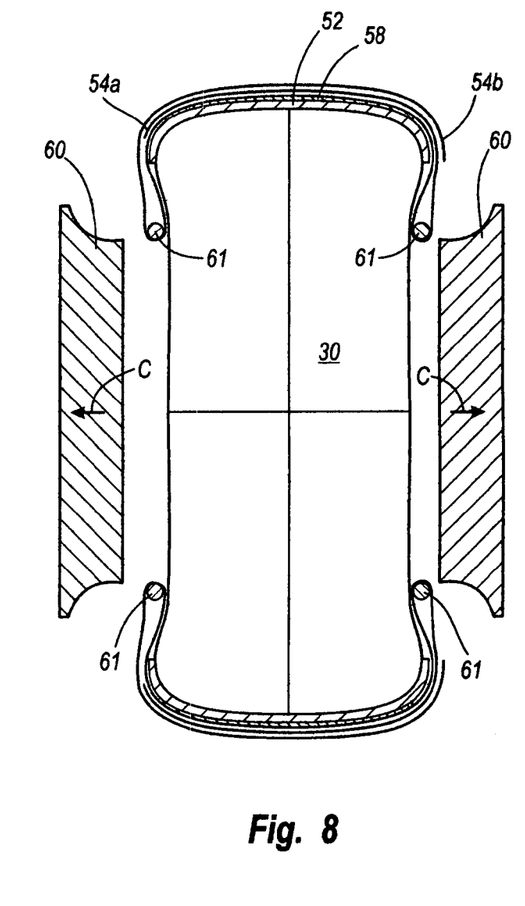
FIG. 8 is a view like that of FIG. 7 after the left side of the plies cords sleeve has been folded around the bead and fitted over the core build mandrel side wall and across the top surface, and showing the core hard plates being removed, illustrated by arrows C.

FIG. 7 shows the core build mandrel 30 with the plies sleeve 10 fitted thereover and shows each of the hard plate assemblies 60 as having been moved into position alongside each side of the core build mandrel 30, urging beads 61 against the plies sleeve 10. With the plies sleeve end 22 shown as having been folded over the bead 61 and stretched across the core build mandrel top surface or crown 31. Further in FIG. 7, the plies sleeve end 21 is shown with arrows B as being folded around the bead 61 to overlay the plies sleeve section installed over the core build mandrel top surface or crown 31. Which folding of the plies sleeve 10 ends 21 and 22 over the core build mandrel top surface or crown 31 is shown completed in FIG. 8, with the hard plate assemblies 60 being removed, as illustrate by arrows C. In which plies sleeve ends folding, an operator can pull the plies sleeve end over the core build mandrel top surface or crown 31, illustrated by arrows B in FIG. 7, with the plies sleeve 10 stretching to fit over core build mandrel 30, and with the elastic cords 12 stretched appropriately and the plies sleeve ends fitted tightly over the core build mandrel top surface or crown 31, as illustrated in FIG. 8. Which plies sleeve ends are preferably held in place by a applying a wrap, that is preferably formed from a cotton batting material, that holds the overlapping plies sleeve ends 21 and 22 in place, as shown in FIG. 8. Alternatively, the process for wrapping the plies sleeve ends over the core build mandrel top surface or crown 31 can be automated, as illustrated by the arrangement of FIGS. 9 through 12, and as set out below.

Figure 9:
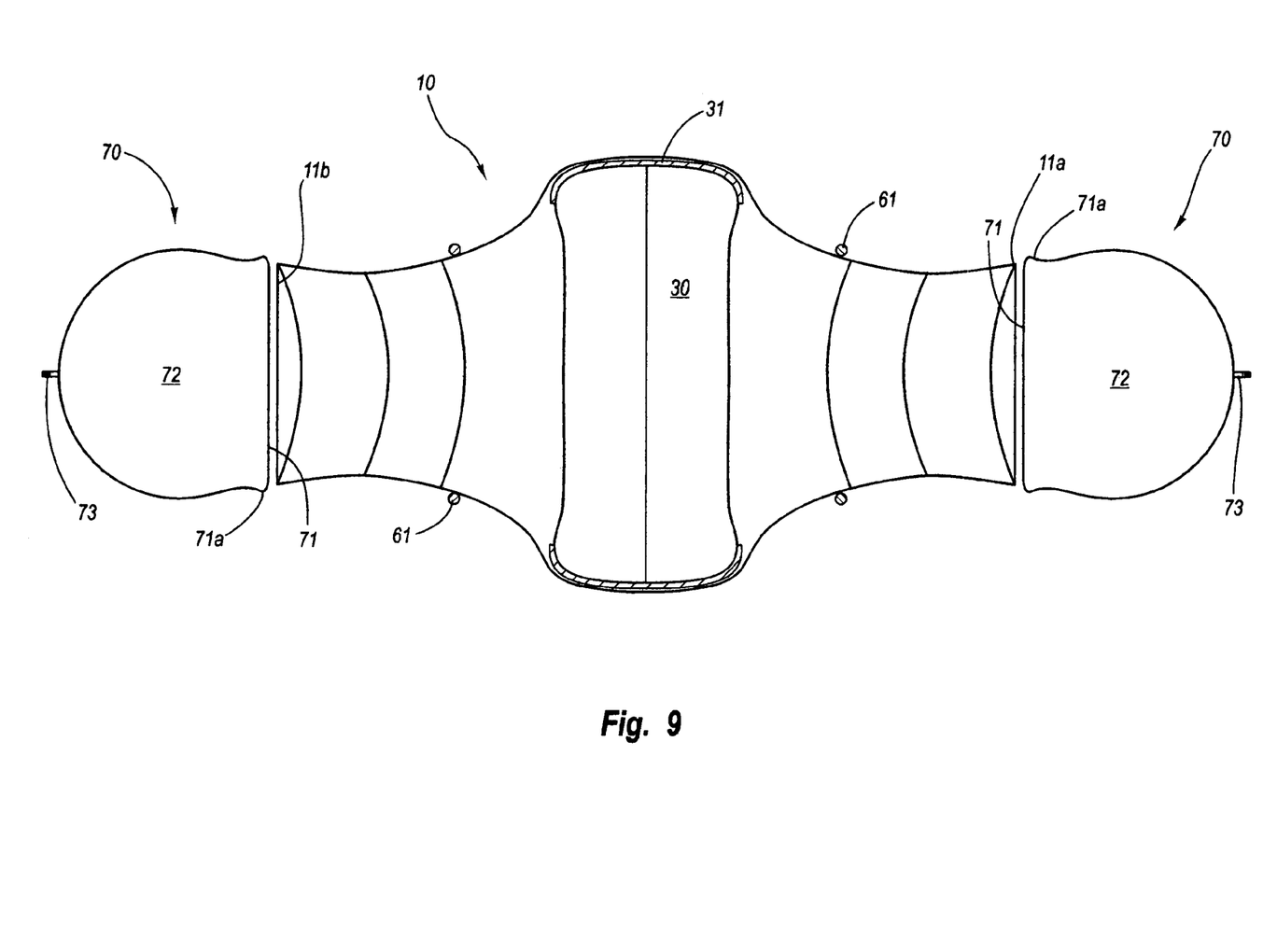
FIG. 9 is a view like that of FIG. 6 except that the plies sleeve ends are both aligned with to be drawn over a pair of bladder and hard plate assemblies for beads centering and plies cords positioning.

FIG. 9 shows a view like that of FIG. 6, except that a pair of bladder and hard plates 70 have been aligned with the plies sleeve ends 11a and 11b. Each bladder and hard plate 70 includes a flexible bladder 72 and hard plate 71, which hard plate 71 is formed from a hard metal or plastic and is for positioning bead 61 to a side of the core build mandrel 30 in the core formation process. The hard plate is mounted onto a side of a balloon type bladder 72 that is to be filled with air under pressure through a valve stem 73. The beads 61 are shown as having been slid along the sleeve 10 into position to receive the hard plate 71 ends 71a fitted there against. So arranged, the sleeve 10 is shown as having been passed over the core build mandrel 30.

Figure 10:
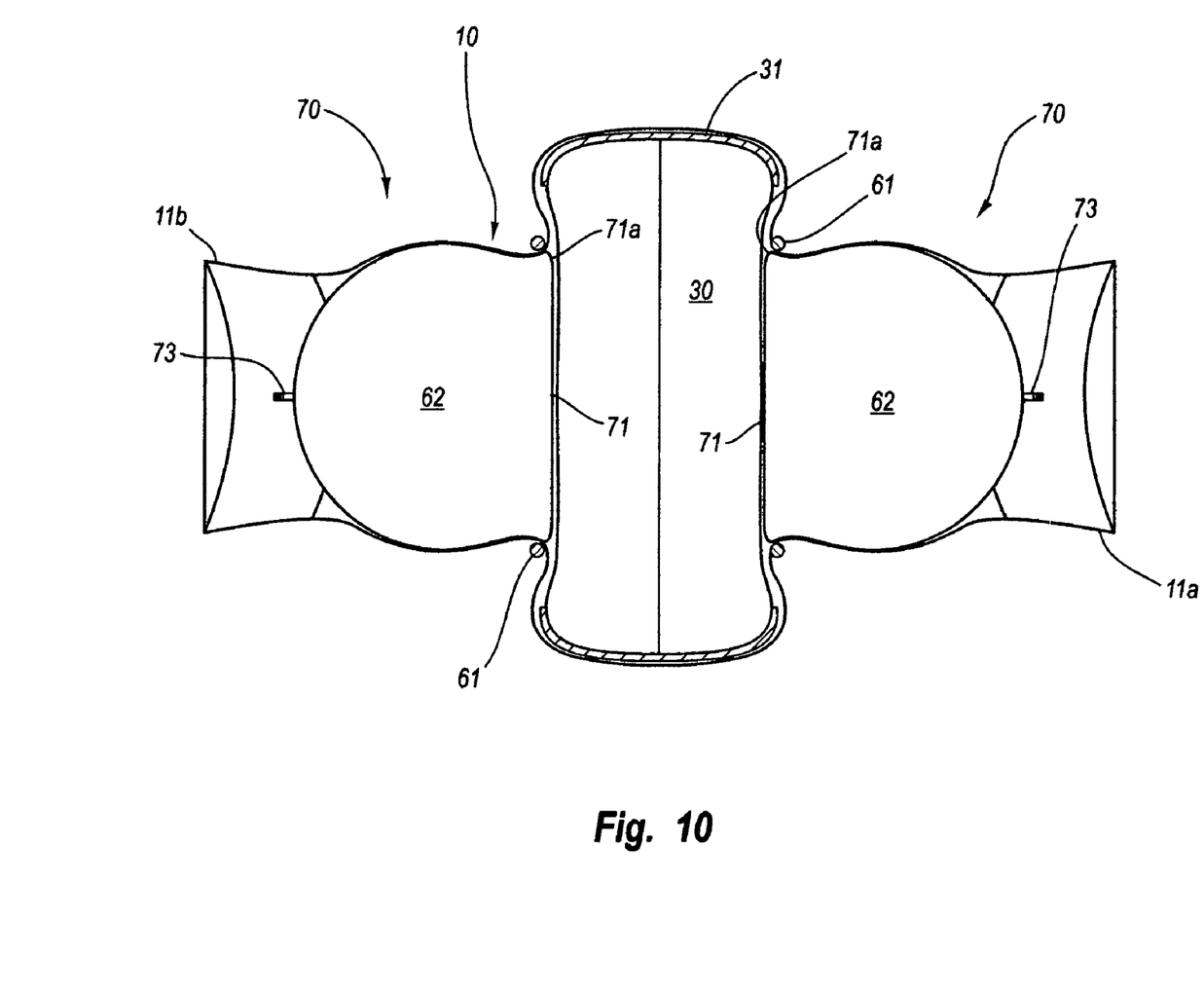
FIG. 10 is a view like that of FIG. 9 that additionally shows the right and left bladder and hard plates fitted into the plies cords sleeve ends and showing beads maintained by the hard plate edges against the core build mandrel sides, with the plies sleeve ends shown as having been drawn over and beyond each of the bladder and hard plates.

FIG. 10 is a view like that of FIG. 9 only showing both bladder and hard plates 70 as having passed into the plies sleeve 10 ends 11a and 11b to where the hard plates 71 and attached bladders 72 have passed into each plies sleeve 10 end 11a and 11b, and with each hard plate 71 edge 71a shown as having engaged a bead 61 and urged it into position against a side of the core build mandrel 30. In which bladder and hard plate 70 passage into through the sleeve end 11a and 11b, each bladder 72 is appropriately drained of air through the valve stem 73 to where it will fit through the sleeve end. In which arrangement, the beads 61 are held against the sides of the core build mandrel 30 and the plies sleeve 10 ends 11a and 11b are ready to be folded over the beads 61 and to extend up the core build mandrel sides.

Figure 11:
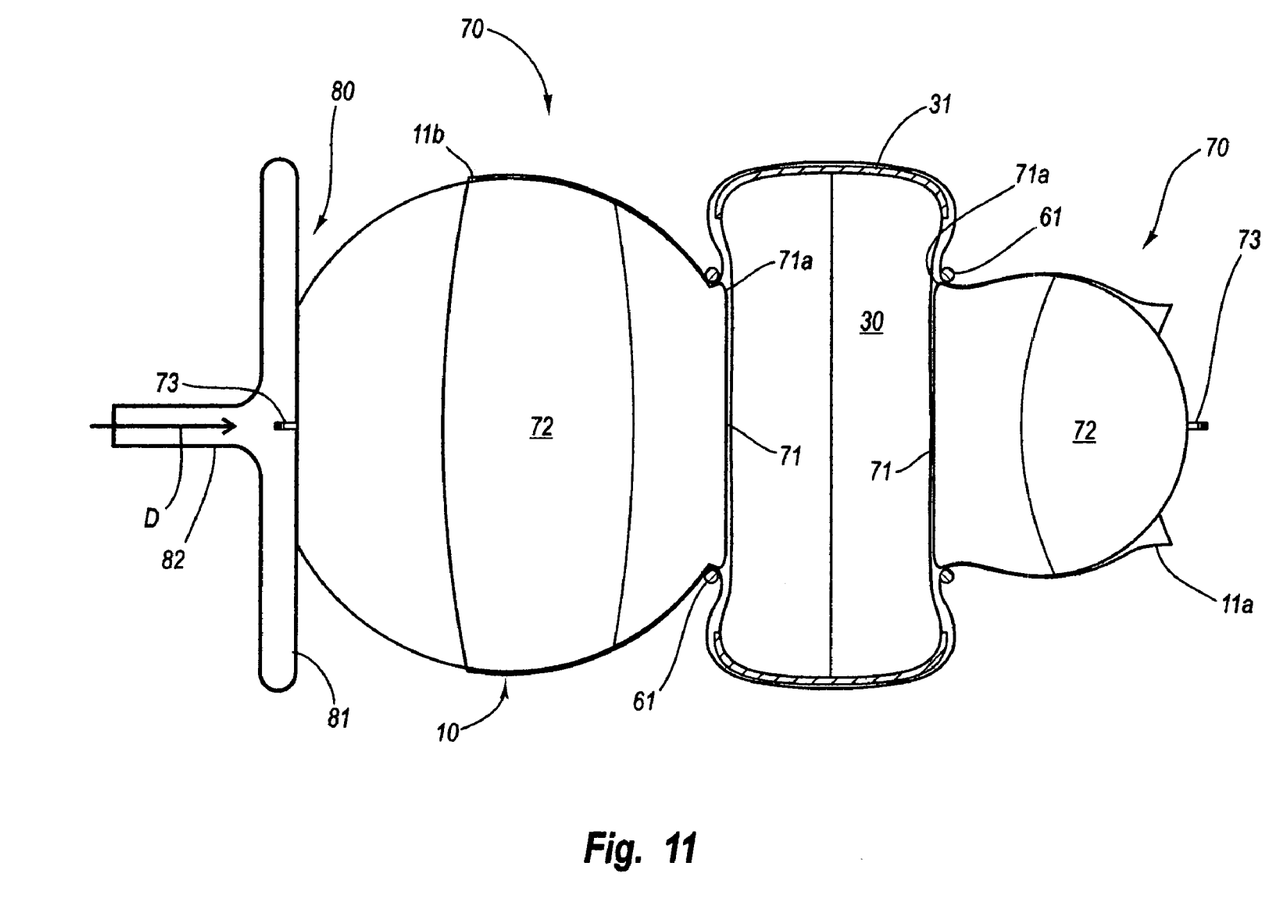
FIG. 11 is a view like that of FIG. 10 except that the left bladder has been inflated and a pressing plate is shown being moved as indicated by arrow D, engaging the side of the inflated bladder away from the core build mandrel.

FIG. 11 is a view like that of FIG. 10 only showing the bladder 72 of the left bladder and hard plate 70 and showing the bladder 72 of the left bladder and hard plate 70 as having been expanded with air, under pressure, passed through the stem 73, as illustrated by an inwardly pointing arrow D. With that expansion, the plies sleeve end 11b is elevated to align with the side of the core build mandrel 30, and a pressure plate 80 is in contact with, and presses against, the expanded bladder 72. Which pressure plate 80 includes a flat piston end 81 whose forward face is in contact with the expanded bladder 72, and includes a push rod end 82 that extends, at a right angle from, the piston end 81 rear face. Preferably, the plies sleeve 10 ends 11a and 11b are left long to be folded one over the other over the core build mandrel 30 top surface or crown 31.

Figure 12:
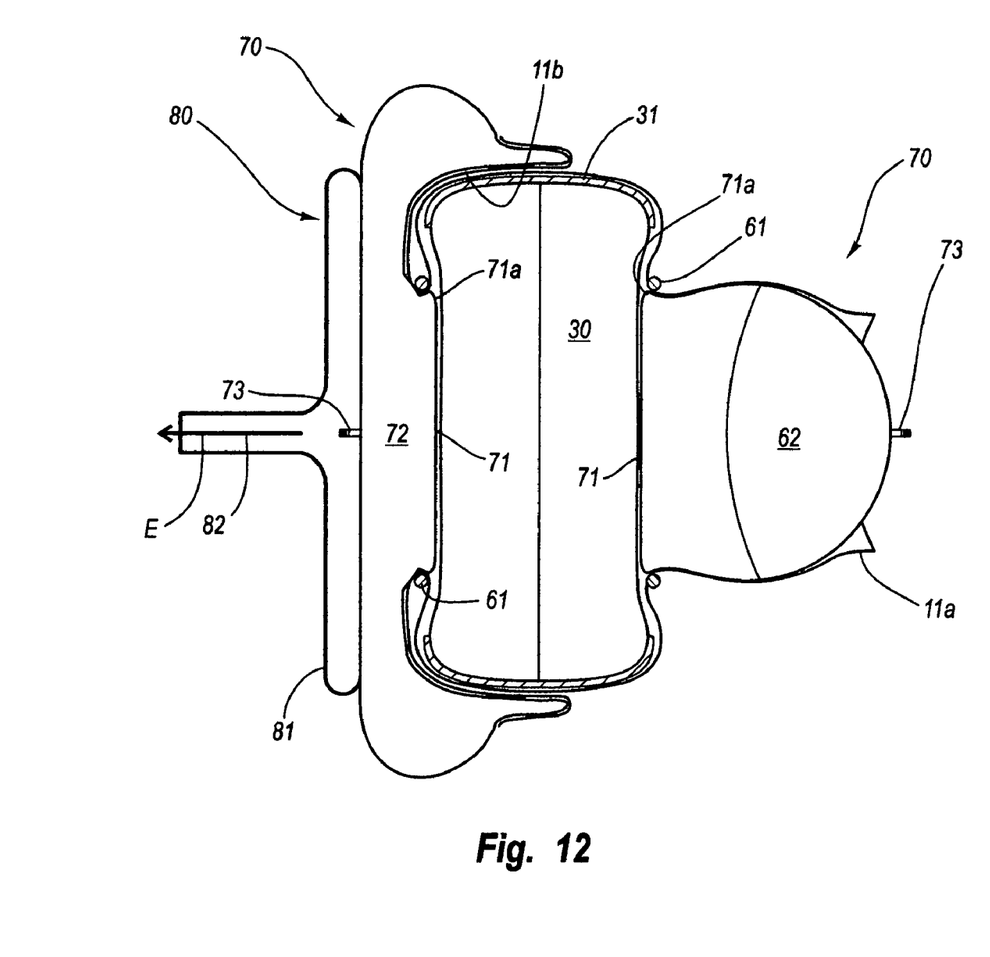
FIG. 12 shows the left bladder of FIG. 11 as having been deflated and is being urged by the pressing plate to flow along the core build mandrel sides and across the top surface or crown, carrying the plies sleeve left end with it, as illustrated by arrows E, the pressing plate as being retracted after the plies sleeve end is in place.

Air is then vented from the bladder 72, as illustrated by an outwardly pointing arrow E, and simultaneously, the pressure plate 80 is moved towards the core build mandrel, with the bladder collapsing and urging the plies sleeve 10 end 11b to flow up the cord build mandrel 30 sides and across the top surface or crown 31 to the attitude shown in FIG. 12. Which bladder 72 folding tends to urge the cords of the plies sleeve 10 end 11b over and away from the bead 61, with the cord ends urged against over the plies sleeve, and stretched across the core build mandrel 30 top surface or crown 31. Which operation can include coating the plies cords above the beads with an adhesive, such as a pre cure elastomer, before the plies cords ends are moved by the deflation of the bladder 72 and travel of the pressure plate 80.

In which bladder folding any trapped air is forced out from the bonding material and between the plies cords and plies cords ends. While the operation of the left bladder and hard plate 70 only has been shown, it should be apparent that the operation of the right side bladder and hard plate 70 is identical, and which bladders and hard plates 70 can operate simultaneously, producing, when the bladders and hard plates are removed, a core of plies and beads formed onto the core build mandrel that is ready to receive a belt or belts applied around the core build mandrel top surface or crown 31, as set out below.

The above description of FIGS. 1 and 6 through 12 sets out a process for providing a core the includes the plies sleeve 10 or the invention and beads 61, with the plies sleeve end areas overlaid over the top surface or crown 31 of the core build mandrel 30. Where, as shown, the plies sleeve 10 ends 11a and 11b cross one another, over the top surface or crown. It should, however, be understood, that, dependent upon the lengths of the plies sleeve cord ends, the sleeve plies cords can be attached onto the core build mandrel sides, stopping at the side junction with the top surface or crown 31.

Figure 13:
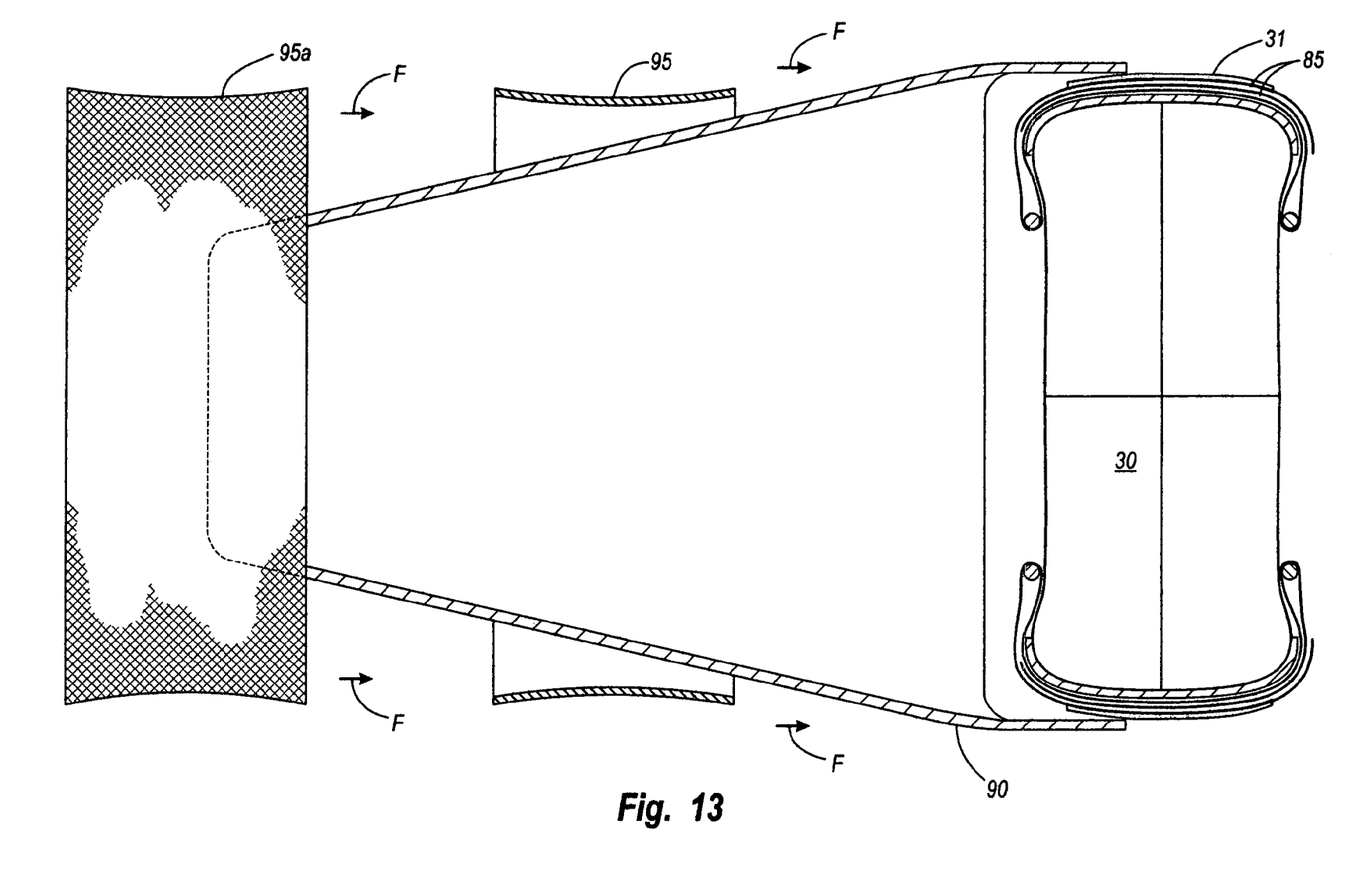
FIG. 13 shows the plies sleeve ends of FIG. 12 as having been urged along the core build mandrel sides and across the top surface or crown, overlapping one another and showing a separator that is a layer of cotton bunting as having be wound around the core build mandrel top surface or crown, holding the sleeve ends in place, and showing the expander cone fitted over the core build mandrel whereon the plies and beads have been assembled, and the separator installed, and showing a first belt sleeve fitted onto the expander cone and first and second belt sleeves shown fitted on and aligned with the expander cone smaller end, and showing, with arrows F, the belt sleeves traveling up the expander core.

Shown in FIG. 13, the core of plies and belts is shown in FIG. 12 has received a separator layer or layers 85 that are preferably sections of cotton batting installed around the core build mandrel 30 top surface or crown 31. A belt expander 90, that is like and functions like, and in practice may be the same as the truncated cone plies expander 20 of FIG. 1 is shown fitted over the side of the core build mold 30 whereon have been arranged the plies sleeve and beads. The belt expander 90, as shown, preferably extends to at or near to the center of the core build mandrel 30. So arranged, as shown in FIG. 13, a first belt 95 and, as required, a second belt 95a can be passed over the belt expander 90 lesser diameter end and slid therealong, as illustrated by arrows F. The first belt 95 travels across the core build mandrel 30 top surface or crown 31, followed by a separator layer, like the separator, followed by the second belt 95a. Whereafter, the belt expander 99 is removed and a top separator or spacer layer is applied to the top surface of the second belt 95a. A preferred spacing material is a four layer section of cotton batting that is approximately eight inches wide, and is wound circumferentially around the top surface or crown 31, holding the plies in place. The sides of which final separator spacer layer are, in turn, pulled down around the core build mandrel 30 shoulders, engaging the plies sleeve 10, and a tire cord, not shown, is applied as by winding a single tire core strand around the belt circumference, with the winding starting on one side of the top surface or crown 31 and proceeding to the other top surface or crown side, completing the assembly of the core of plies sleeve 10, belts 95 and 95a and beads 61, that can then be positioned in a mold and a tire formed therearound utilizing casting, vacuum forming, or another molding method appropriate for forming a tire.

While preferred embodiment of our invention in a plies sleeve for use in forming a transport tire core, has been shown and described herein, it should be understood that variations and changes are possible to plies sleeve and method for its use in the formation of a tire, and the materials used, without departing from the subject matter coming within the scope of the following claims, and a reasonable equivalency thereof, which claims we regard as our invention.

We claim:

1. A plies sleeve for use in a formation of a plies, beads and belts for installation in a mold for forming an elastomeric tire therearound comprising, a woven tubular sleeve having a uniform diameter along its length, and a weave that is a lattice of interlaced cords selected to form said tubular sleeve that will allow said tubular sleeve to stretch around its circumference to fit over a tire core build mandrel top surface or crown, and to retract into snug fitting engagement over and around said tire core build mandrel top surface or crown, and which said weave incorporates spiral woven Rayon cords that are spaced at equal distance apart and interlace with and cross elastic cords and said elastic cords are formed from an elastic polyurethane pre-cure material that are wound with cotton along each said elastic cord length, and said pre-cure material will cure with the exothermic heat of reaction of a urethane mixture selected to form a tire around a core that includes said plies sleeve, providing a chemical mechanical lock within the formed tire to said Rayon cords and cotton windings.

2. The plies sleeve as recited in claim 1, wherein the weave that is a lattice of interlaced Rayon and elastic cords provides for a lateral sleeve expansion of approximately four times its un-stretched state.

3. The plies sleeve as recited in claim 1, wherein the Rayon cords are Rayon 2440/2 denier cords that are spiral woven to a spacing distance of seven point five (7.5) plies per inch.

4. The plies sleeve as recited in claim 1, wherein the cotton wound pre-cure urethane elastic cords are woven into the tubular sleeve at a spacing distance of eight (8) plies per inch.

5. The plies sleeve as recited in claim 1, wherein the plies sleeve is cut to a length such, that, with the tire core build mandrel centered in said plies sleeve, the plies sleeve end portions will each extend from a tire core build mandrel crown surface edge, down each mandrel side to fold around beads position on said core build mandrel sides, and back up said plies sleeve end portion.

* * * * *